May 12, 1970     W. V. CHILDS     3,511,762

ELECTROCHEMICAL CONVERSION

Filed Nov. 2, 1967     4 Sheets-Sheet 1

INVENTOR.
W. V. CHILDS
BY *Young and Quigg*

ATTORNEYS

May 12, 1970  W. V. CHILDS  3,511,762
ELECTROCHEMICAL CONVERSION
Filed Nov. 2, 1967  4 Sheets-Sheet 2

INVENTOR.
W. V. CHILDS
BY
*Young and Quigg*
ATTORNEYS

May 12, 1970

W. V. CHILDS 3,511,762

ELECTROCHEMICAL CONVERSION

Filed Nov. 2, 1967

INVENTOR.
W. V. CHILDS
BY Young and Quigg

ATTORNEYS

INVENTOR.
W. V. CHILDS
BY
ATTORNEY

United States Patent Office 3,511,762
Patented May 12, 1970

3,511,762
ELECTROCHEMICAL CONVERSION
William V. Childs, Bartlesville, Okla., assignor to Phillips Petroleum Company, a corporation of Delaware
Filed Nov. 2, 1967, Ser. No. 680,123
Int. Cl. B01k 3/04, 3/08
U.S. Cl. 204—59                                  17 Claims

ABSTRACT OF THE DISCLOSURE

Electrode assemblies comprising a porous element, means for introducing a reactant into the pores of said porous element through a first surface thereof, and means for withdrawing product and any unreacted reactant from said pores through a spaced apart second surface of said porous element, are provided for use in electrochemical conversion processes. Methods of using said electrode assemblies are also provided.

---

This invention relates to electrode assemblies comprising a porous element. In one aspect this invention relates to electrode assemblies comprising a porous element which assemblies are adapted for introduction of a reactant in to the pores of said porous element through a first surface thereof and withdrawal of product from said pores through a second spaced apart surface of said porous element. In another aspect this invention relates to methods of employing said porous electrode assemblies in electrochemical conversion processes.

In electrochemical conversion processes, products are very frequently formed at both the anode and the cathode. In prior art processes said products are frequently permitted to mix with each other in the cell and separation is made after withdrawal of the products from the cell. This sometimes complicates the separation processes in that isolation of one or more of the desired produsts is difficult or expensive. Semipermeable cell dividers can be employed to separate the cell into an anode compartment and a cathode compartment and thus keep the anode products and the cathode products separated. Generally speaking, this is undesirable because the use of said cell dividers increases the internal resistance of the cell and makes the operation thereof more expensive. Furthermore, in some electrochemical processes it would be desirable to withdraw the products and/or any unreacted feedstock from the cell without contact between same and the main body of electrolyte. This has not been possible in those prior art processes wherein the reactant feedstock is passed through the pores of a porous electrode and into the main body of electrolyte.

The present invention provides an improved electrode assembly comprising a porous element, which electrode assembly can be employed in electrochemical conversion processes to eliminate or mitigate the above-described difficulties.

Thus, broadly speaking, the present invention resides in an electrode assembly comprising a porous element and which is adapted for the introduction of a reactant into the pores of said porous element through a first surface thereof and withdrawal of the products and any unreacted feedstock from said pores at a second spaced apart surface of said porous element. Electrochemical conversion processes wherein said electrodes can be employed are also provided.

An object of this invention is to provide an improved electrode assembly. Another object of this invention is to provide an improved electrode assembly adapted to be employed in electrochemical conversion processes. Another object of this invention is to provide an improved electrode assembly comprising a porous element, which when employed in an electrochemical conversion process is adapted for carrying out said conversion within the pores of said porous element. Another object of this invention is to provide an improved electrode assembly comprising a porous element and which is adapted for the introduction of a reactant into the pores of said porous element through a first surface thereof and the withdrawal of product and any unreacted reactant from said pores through a second spaced apart surface of said porous element. Another object of this invention is to provide an improved electrode assembly which is especially suitable to be employed in electrochemical fluorination processes. Still another object of this invention is to provide electrochemical conversion prossesses wherein said improved electrode assembly can be employed. Other aspects, objects, and advantages of the invention will be apparent to those skilled in the art in view of this disclosure.

Thus, according to the invention, there is provided an electrode assembly, suitable for carrying out electrochemical reactions in an electrolysis cell containing an electrolyte, comprising: a porous element; a first conduit means in communication with a first surface of said porous element for introducing a reactant feedstock into the pores of said porous element; and a second conduit means in communication with a second surface of said porous element for withdrawing reaction product and any unreacted feedstock from said pores; said second surface being spaced apart from said first surface.

Further according to the invention, there is provided an improved electrochemical conversion process wherein said improved electrode assembly can be employed.

A number of advantages are realized when the improved eletrode assembly of the invention is employed in an electrochemical conversion process. As indicated above, in electrochemical conversion processes wherein the improved electrode assemblies of the invention are employed, the conversion of the reactant feedstock takes place within the pores of the porous element of the electrode. It has been found that a lower voltage is required when the conversion takes place within the pores of the electrode as compared to the operation wherein the feedstock is passed through the pores of the electrode and then into the main body of the electrolyte with the conversion taking place in said electrolyte. A still further advantage is that the anode products and the cathode products can be maintained separate. For example, if an electrode assembly in accordance with the invention is employed as the anode, and/or as the cathode, it is not necessary to employ a divider or membrane in the cell to divide said cell into an anode compartment and a cathode compartment. This makes is possible to operate the cell with less internal cell resistance. Furthermore, in some instances the anode products and cathode products are reactive with each other and must be maintained separate. The electrodes of the invention make it possible to do so without a cell divider. Still another advantage is that the operation of the electrodes of the present invention are essentially free of the nuisance of anode polarization, a condition which periodically occurs in conventional anodic transformations and which generally requires an interruption in the process while a remedy is being undertaken. Still another advantage is that since the anode products and cathode products can be maintained separately, the invention makes is more convenient to employ electrochemical cells in serial operation, e.g., to use the anode products of one cell as the feedstock for a succeeding cell. Thus, a number of smaller cells can be conveniently and efficiently employed where the operation of fewer but larger cells would be more cumbersome, more expensive, or less efficient. Another important advantage is that the electrode assemblies of the invention are adapted for fabrication in a wide variety of configurations and sizes.

The porous element of the electrode assemblies of the invention can be fabricated from any suitable conducting porous electrolyte resistant material which is compatible with the system, e.g., nickel, iron, various metal alloys, and carbon, which is not wetted by the electrolyte. By "not wetted" is meant that the contact angle between the electrolyte and the electrode must exceed 90° in order that anticapillary forces will prevent substantial invasion of the small pores of the porous element by the electrolyte. Porous carbon, which is economical and readily available in ordinary channels of commerce, is presently preferred for said porous element. Porous carbon impregnated with a suitable metal such as nickel can also be used as the porous element. Various grades of porous carbon can be used in the practice of the invention. It is preferred to employ porous carbon which has been made from carbon produced by pyrolysis, and not graphitic carbon. Two types of commercially available porous carbon are those known commercially as Stackpole 139 and National Carbon Grade 60. Said Stackpole 139 carbon has a pore volume of about 0.2 to about 0.3 cc. per gram with the pore diameters ranging from 0.1 to 10 microns in diameter. Said National Carbon Grade 60 has a pore volume of about 0.3 to about 0.5 cc. per gram with the pore diameters ranging from 10 to 60 microns in diameter. The actual values of said pore volumes will depend upon the specific method employed for determining same. Thus, preferred porous carbons for fabricating electrode assemblies in accordance with the invention can include those having a pore volume within the range of about 0.2 to about 0.5 cc. per gram with the pores ranging from 0.1 to 60 microns in diameter. The electrodes of the invention can be fabricated in any suitable shape or design, but must be arranged or provided with a suitable means for introducing the feed reactant material into the pores of the porous element thereof.

The electrode assemblies of the invention can be employed in any convenient cell configuration or electrode arrangement. The only requirements are that the cell body and the electrodes in the cell be fabricated of materials which are resistant to the action of the contents of the cell under the reaction conditions. Materials such as steel, iron, nickel, polytetrafluoroethylene (Teflon), carbon, and the like, can be employed for the cell body. When a nonporous cathode or a nonporous anode is employed which is not fabricated in accordance with this invention (along with a porous anode or a porous cathode of the invention), said nonporous cathode or nonporous anode can be fabricated in any suitable shape or design and can be made of any suitable conducting material such as iron, steel, nickel, alloys of said metals, and carbon. For example, said nonporous cathode can be fabricated from a metal screen or gauze, a perforated plate, and can have a shape complementary to the shape of the porous anode.

The electrode assemblies of the invention can be employed in a wide variety of electrochemical conversion processes. Said electrode assemblies can be employed in any electrochemical conversion process in which a porous electrode can be employed. Some examples of such processes are electrochemical halogenation, electrochemical cyanation, and cathodic conversions such as the reduction of alcohols to hydrocarbons or the reduction of acids to alcohols. One electrochemical conversion process in which the electrode assemblies of the invention are particularly valuable is the electrochemical fluorination of fluorinatable materials in the presence of an essentially anhydrous liquid hydrogen fluoride containing electrolyte. Thus, for purposes of convenience, and not by way of limitation, the electrode assemblies of the invention will be further described in terms of being employed as an anode in the electrochemical fluorination of fluorinatable materials when using said hydrogen fluoride containing electrolyte.

In copending application Ser. No. 683,089, filed Nov. 2, 1967, by H. M. Fox and F. N. Ruehlen, there is disclosed and claimed an improved electrochemical process for efficiently and conveniently preparing fluorine-containing compounds. In said process the extent of fluorination of the fluorinatable compound can be readily controlled. Consequently, said process is capable of producing a wide variety of fluorine-containing products with high efficiency and good selectivity. Compared with the fluorination processes of the prior art, the reaction conditions utilized in said process are mild, and the yields of product per kilowatt hour or per unit of anode area are extraordinarily high.

Another surprising result or advantage of the invention of said copending application is that the primary products obtained are predominantly partially fluorinated materials. It is difficult to obtain such materials in the methods of the prior art and, as stated above, even more difficult to produce moderately fluorinated hydrocarbons containing fluorine atoms in certain specific locations in the molecule. It is the reactive nature of fluorine to bind itself to a carbon atom to which one or more previous fluorine atoms have already been bound. Thus, any difluoro compounds made by direct fluorination techniques of the prior art almost invariably have both the fluorine atoms attached to the same carbon atom. This has made it necessary to employ indirect methods such as the preparation of appropriate chloro- or hydroxy-analogs followed by replacement of such groups with fluorine. The invention of said copending application provides a direct fluorination process which unexpectedly produces good yields of difluoro compounds in which the two fluorine atoms are not on the same carbon atom. As specific examples, 1,2-difluoroethane and 1,4-difluorobutane can be easily and directly produced in good yields.

In the process of the invention of said copending application a current-conducting essentially anhydrous liquid hydrogen fluoride electrolyte is electrolyzed in an electrolysis cell provided with a cathode and a porous anode (preferably porous carbon), a fluorinatable organic compound is introduced into the pores of said anode and therein at least a portion of said organic compound is at least partially fluorinated within the pores of said anode, and fluorinated compound products are recovered from said cell. The present invention provides improved electrode assemblies which are especially suited to be employed as anodes in the process of said copending application.

Very few organic compounds are resistant to fluorination. Consequently, a wide variety of feed materials, both normally liquid and normally gaseous compounds, can be used as feedstocks in said process. Organic compounds which are normally gaseous or which can be introduced in gaseous state into the pores of a porous anode under the conditions employed in the electrolysis cell, and which are capable of reacting with fluorine, are presently preferred as starting materials. However, starting materials which are introduced into the pores of the anode in liquid state can also be used. Generally speaking, desirable organic starting materials which can be used are those containing from 1 to 8, preferably 1 to 6, carbon atoms per molecule. However, reactants which contain more than 6 or 8 carbon atoms can also be used. If desired, suitable feed materials having boiling points above cell operating temperatures can be passed into the pores of the porous anode in gaseous state by utilizing a suitable carrier gas. Thus, a suitable carrier gas can be saturated with the feed reactant (as by bubbling said carrier gas through the liquid reactant), and then passing the saturated carrier gas into the pores of the porous anode. Suitable carrier gases include the inert gases such as helium, argon, krypton, neon, xenon, nitrogen, etc. Normally gaseous materials such as hydrocarbons containing from 1 to 4 carbon atoms can also be used as carrier gases. These latter gases will react, but in many instances this will not be objectionable. The above-described carrier gases, and particularly said inert gases, can also be used as diluents for the feedstocks which are normally gaseous at cell operating conditions.

Some general types of starting materials which can be used include, among others, the following: alkanes, alkenes, alkynes, amines, ethers, esters, mercaptans, nitriles, alcohols, aromatic compounds, and partially halogenated compounds of both the aliphatic and aromatic series. It will be understood that the above-named types of compounds can be either straight chain, branched chain, or cyclic compounds. Partially chlorinated and the partially fluorinated compounds are the preferred partially halogenated compounds. The presently preferred starting materials are the saturated and unsaturated hydrocarbons (alkanes, alkenes, and alkynes) containing from 1 to 6 carbon atoms per molecule. The presently more preferred starting materials are the normally gaseous organic compounds, and particularly said saturated and unsaturated hydrocarbons, containing from 1 to 4 carbon atoms per molecule.

Since fluorine is so reactive, no list of practical length could include all starting materials which can be used. However, representative examples of the above-described starting materials include, among others, the following: methane; ethane; propane; butane; isobutane; pentane; n-hexane; n-octane; cyclopropane; cyclopentane; cyclohexane; cyclooctane; 1,2-dichloroethane; 1-fluoro-2-chloro-3-methylheptane; ethylene; propylene; cyclobutene; cyclohexene; 2-methylpentene-1; 2,3-dimethylhexene-2; butadiene; vinyl chloride; 3-fluoropropylene; acetylene; methylacetylene; vinylacetylene; 3,3-dimethylpentyne-2; allyl chloride; methylamine; ethylamine; diethylamine; 2-amino-3 - ethylpentane; 3 - bromopropylamine; triethylamine; dimethyl ether; diethyl ether; methylethyl ether; methylvinyl ether; 2-iodoethylmethyl ether; di-n-propyl ether; methyl formate; methyl acetate; ethyl butyrate; ethyl formate; n-amyl acetate; methyl 2-chloroacetate; methyl mercaptan; ethyl mercaptan; n-propyl mercaptan; 2-mercaptohexane; 2-methyl-3-mercaptoheptane; acetonitrile; propionitrile; n-butyronitrile; acrylonitrile; n-hexanonitrile; methanol; ethanol; isopropanol; n-hexanol; 2,2-dimethylhexanol-3; n-butanol; ethylene-bromohydrin; benzene; toluene; cumene; o-xylene; p-xylene; and monochlorobenzene.

The electrochemical fluorination process is carried out in a medium of hydrogen fluoride electrolyte. Although said hydrogen fluoride electrolyte can contain small amounts of water, such as up to about 5 weight percent, it is preferred that said electrolyte be essentially anhydrous. Generally speaking, it is preferred that said electrolyte contain not more than about 0.1 weight percent water. However, commercial anhydrous liquid hydrogen fluoride which normally contains dissolved water in amounts ranging from a trace (less than 0.1 weight percent up to about 1 percent by weight can be used. Thus, as used herein and in the claims, the term "essentially anhydrous liquid hydrogen fluoride," unless otherwise specified, includes liquid hydrogen fluoride which can contain water not exceeding up to about 1 weight percent. As the electrolysis reaction proceeds, any water contained in the hydrogen fluoride electrolyte is slowly decomposed and said electrolyte concomitantly approaches the anhydrous state. When using one of the more expensive feed materials, one preferred method of operating when starting a cell with a new electrolyte which contains traces of water is to electrolyze said electrolyte for a few hours while using an inexpensive feed material such as methane, prior to introducing the more expensive feed material so as to remove said water. The hydrogen fluoride electrolyte is consumed in the reaction and must be either continuously or intermittently placed in the cell.

Pure anhydrous liquid hydrogen fluoride is nonconductive. The essentially anhydrous liquid hydrogen fluorides described above have a low conductivity which, generally speaking, is lower than desired for practical operation. To provide adequate conductivity in the electrolyte, and to reduce the hydrogen fluoride vapor pressure at cell operating conditions, an inorganic additive can be incorporated in the electrolyte. Examples of suitable additives are inorganic compounds which are soluble in liquid hydrogen fluoride and provide effective electrolytic conductivity. The presently preferred additives are the alkali metal (sodium, potassium, lithium, rubidium, and cesium) fluorides and ammonium fluoride. Other additives which can be employed are sulphuric acid and phosphoric acid. Potassium fluoride, cesium fluoride, and rubidium fluoride are the presently preferred additives. Potassium fluoride is the presently most preferred additive. Said additives can be utilized in any suitable molar ratio of additive to hydrogen fluoride within the range of from 1:4.5 to 1:1, preferably 1:4 to 1:2. The presently most preferred electrolytes are those which correspond approximately to the formulas $KF \cdot 2HF$, $KF \cdot 3HF$, or $KF \cdot 4HF$. Such electrolytes can be conveniently prepared by adding the required quantity of hydrogen fluoride to $KF \cdot HF$ (potassium bifluoride). In general, said additives are not consumed in the process and can be used indefinitely. Said additives are frequently referred to as conductivity additives for convenience.

The electrochemical fluorination can be effectively and conveniently carried out over a broad range of temperatures and pressures limited only by the freezing point and the vapor pressure of the electrolyte. Generally speaking the fluorination process can be carried out at temperatures within the range of from minus 80 to 500° C. at which the vapor pressure of the electrolyte is not excessive, e.g., less than 250 mm. Hg. It is preferred to operate at temperatures such that the vapor pressure of the electrolyte is less than about 50 mm. Hg. As will be understood by those skilled in the art, the vapor pressure of the electrolyte at a given temperature will be dependent upon the composition of said elecrolyte. It is well known that additives such as potassium fluoride cause the vapor pressure of liquid hydrogen fluoride to be decreased an unusually great amount. A presently preferred range of temperature is from about 60 to about 105° C. Higher temperatures sometimes tend to promote fragmentation of the product molecules.

Pressures substantially above or below atmospheric can be employed if desired, depending upon the vapor pressure of the electrolyte as discussed above. In all instances, the cell pressure will be sufficient to maintain the electrolyte in liquid phase. Generally speaking, the process is conveniently carried out at substantially atmospheric pressure. It should be pointed out that a valuable feature of the process is that the operating conditions of temperature and pressure within the limitations discussed above are not critical and are essentially indepednent of the type of feed employed in the process.

For purposes of efficiency and economy, the rate of direct current flow through the cell is maintained at a rate which will give the highest practical current densities for the electrodes employed. Generally speaking, the current density will be high enough so that anodes of moderate size can be employed, yet low enough so that the anode is not corroded or disintegrated under the given current flow. Current densities within the range of from 30 to 1000, or more, preferably 50 to 500 milliamps per square centimeter of anode geometric surface area can be used. Current densities less than 30 milliamps per square centimeter of anode geometric surface area are not practical because the rate of fluorination is too slow. The voltage which is employed will vary depending upon the particular cell configuration employed and the current density employed. In all cases, under normal operating conditions, however, the cell voltage or potential will be less than that required to evolve or generate free or elemental fluorine. Voltages in the range of from 4 to 12 volts are typical. The maximum voltage will not exceed 20 volts per unit cell. Thus, as a guide, voltages in the range of 4 to 20 volts per unit cell can be used.

As used herein and in the claims, unless otherwise specified, the term "anode geometric surface" refers to the outer geometric surface area of the porous carbon element of the anode which is exposed to electrolyte and does not include the pore surfaces of said porous element. For example, in FIG. 2 the anode geometric surface is the vertical cylindrical side wall of the porous carbon element 40.

The feed rate of the fluorinatable material being introduced into the pores of the porous carbon element of the anode is an important process variable in that, for a given current flow or current density, the feed rate controls the degree of conversion. Similarly, for a given feed rate, the amount of current flow or current density can be employed to control the degree of conversion. Feed rates which can be employed will preferably be in the range of from 0.5 to 10, milliters per minute per square centimeter of anode geometric surface area. With the higher feed rates, higher current density and current rates are employed. Since the anode can have a wide variety of geometrical shapes, which will affect the geometrical surface area, a sometimes more useful way of expressing the feed rate is in terms of anode cross-sectional area (taken perpendicular to the direction of flow). On this basis, for the anode employed in Example I, the above range would be 25 to 500 milliliters per minute per square centimeter of cross-sectional area.

The actual feed rate employed will depend upon the type of carbon used in fabricating the porous element of the anode as well as several other factors including the nature of the feedstock, the conversion desired, current density, etc., because all these factors are interrelated and a change in one will affect the others. The feed rate will be such that the feed stock is passed into the pores of the anode, and into contact with the fluorinating spices therein, at a flow rate such that the inlet pressure of said feedstock into said pores is essentially less than the sum of (a) the hydrostatic pressure of the electrolyte at the level of entry of the feedsock into said pores and (b) the exit pressure of any unreached feedstock and fluorinated products from said pores into the electrolyte. Said exit pressure is defined as the pressure required to form a bubble on the outer surface of the anode and break said bubble away from said surface. Said exit pressure is independent of hydrostatic pressure. Under these flow conditions there is established a pressure balance between the feedstock entering the pores of the anode from one direction and electrolyte attempting to enter the pores from another and opposing direction. This pressure balance provides an important and distinguishing feature in that essentially none of the feed leaves the anode to form bubbles which escape into the main body of the electrolyte. Essentially all of the feedstock travels within the carbon anode via the pores therein until it reaches a collection zone within the anode from which it is removed via a conduit, or until it exists from the anode at a point above the surface of the electrolyte.

The more permeable carbons will permit higher flow rates than the less permeable carbons. Any suitable porous carbon which will permit operation within the limits of the above-described pressure balance can be employed in fabricating the porous element of the electrode assemblies of this invention. Thus, broadly speaking, porous carbons having a permeability within the range of from 0.5 to 75 darcys and average pore diameters within the range of from 1 to 150 microns can be employed in practicing this invention. Generally speaking, carbons having a permeability within the range of from about 2 to about 30 darcys and an average pore diameter within the range of from about 20 to about 75 microns are more preferred.

Similarly, electrode shapes, electrode dimensions, and manner of disposal of the electrode in the electrolyte will also have a bearing on the flow rate. Thus, owing to the many different types of carbon which can be employed and the almost infinite number of combinations of electrode shapes, dimensions, and methods of disposal of the electrode in the electrolyte, there are no really fixed numerical limits on the flow rates which can be used. Broadly speaking, the upper limit on the flow rate will be that at which "breakout" of feedstock and/or fluorinated product begins along the immersed portion of the anode (electrode) when the anode is provided with an internal collection zone as in FIG. 2 or FIG. 3, or the top of the anode is above the surface of the electrolyte as in FIG. 11. Herein and in the claims, unless otherwise specified, "breakout" is defined as the formation of bubbles of feedstock and/or fluorinated product on the outer immersed surface of the anode (electrode) with subsequent detachment of said bubbles wherein they pass into the main body of the electrolyte. Broadly speaking, the lower limit of the feed rate will be determined by the requirement to supply the minimum amount of feedstock sufficient to prevent evolution of free fluorine. As a practical guide to those skilled in the art, the flow rates can be within the range of from 3 to 600, preferably 12 to 240, cc. per minute per square centimeter of cross-sectional area (taken perpendicular to the direction of flow).

The above-described pressure balance will permit some invasion of the pores of the anode by the hydrogen fluoride electrolyte. The amount of said invasion will depend upon the inlet pressure of the feedstock and the pore size. The larger size pores are more readily invaded. It has been found that porous carbon anodes as described herein can be successfully operated when up to 40 to 50 percent of the pores have been invaded by liquid HF electrolyte.

The feed material and the products obtained therefrom are retained in the cell for a period of time which is generally less than one minute. The fluorinated products and the unconverted feed are passed from the cell and then are subjected to conventional separation techniques such as fractionation, solvent extraction, adsorption, and the like, for separation of unconverted feed and reaction products. Unconverted or insufficiently converted feed materials can be recycled to the cell for the production of more highly fluorinated products, if desired. Perfluorinated products, or other products which have been too highly fluorinated, can be burned to recover hydrogen fluoride which can be returned to the cell, if desired. By-product hydrogen can be burned to provide heat energy or can be utilized in hydrogen-consuming processes such as hydrogenation, etc.

Figure 1:
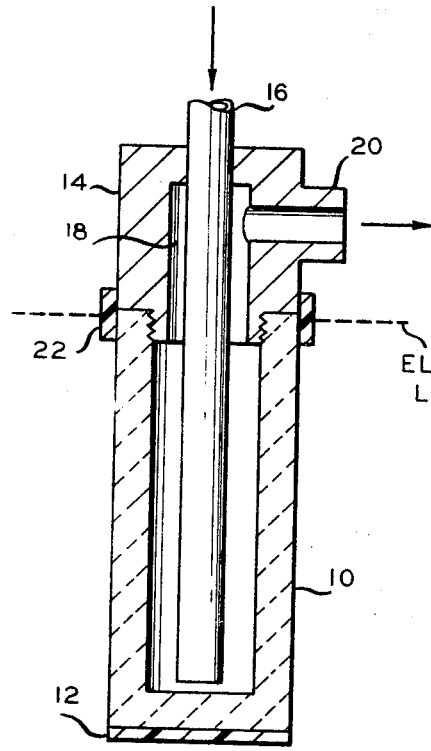
FIG. 1 is a view, partly in cross section, illustrating one electrode assembly in accordance with the invention.

Referring now to said drawings, the invention will be more fully explained. In FIG. 1, there is illustrated an electrode assembly in accordance with the invention wherein the porous element 10 has the general shape of a hollow tube, closed at one end thereof, and open at the other end. The bottom of said porous element is sealed with a suitable resistant cement material 12 such as Fluoroseal. Said porous element 10 is mounted onto the lower end of a generally tubular cap 14 by means of the threads shown. Any other suitable means for attaching porous element 10 to cap 14 can be employed. Said cap 14 can be fabricated from any suitable metal such as brass or suitable plastic such as Teflon. A first conduit 16 extends through said cap 14 into the lower portion of the interior of porous element 10 to a point adjacent said closed end thereof. The outlet of said conduit 16 is thus in communication with the bottom interior surface which comprises a first surface of said porous element 10 for the introduction of feedstock into the pores of said porous element 10. An annular space 18 surrounds said first conduit 16 where it passes through said cap 14. A second conduit 20 extends outwardly from said cap 14 and is in communication with said annular space 18. It will be noted that via said annular space 18 said conduit 20 is also in communication with the upper portion of the inner wall of said porous element 10. Said upper portion of said inner wall comprises a second surface of said porous element 10 for the withdrawal of products and any unreacted feedstock from said porous element. The electrode assembly is shown as being positioned in a body of electrolyte. If desired, the region where said porous element 10 joins cap 14 can be covered with an external seal 22, such as a Teflon tape. This seal is preferably provided at the area of the electrode level as shown.

Figure 3:
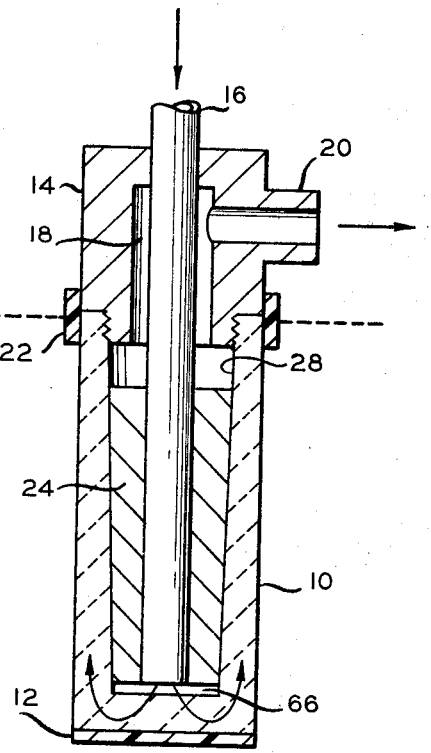
FIG. 3 is a view, in cross section, of another electrode assembly in accordance with the invention.

Referring now to FIG. 3, there is shown another electrode assembly in accordance with the invention which is similar to that illustrated in FIG. 1. The principal difference between the two electrode assemblies is that in FIG. 3 a metal plug 24 is mounted on the lower end portion of said first conduit 16 in a close fitting relationship with the inner wall of porous element or member 10. Said metal plug thus divides the inner wall of porous element 10 into a lower first surface and an upper second surface. Said lower first surface can be defined as comprising the chamber 66 which is formed at the lower end of conduit 16. Said upper second surface can be defined as the portion 28 of the inner wall of porous element 10 which is in communication with annular space 18. In the anode assembly of FIG. 3 a more positive arrangement for forcing more of the feed material into the pores of porous element 10 is provided. Said feed material is thus more positively forced to enter the pores via said first surface (the walls of chamber 66), pass upwardly through the network of pores in element 10, and exit from said pores through said second surface 28.

Figure 2:
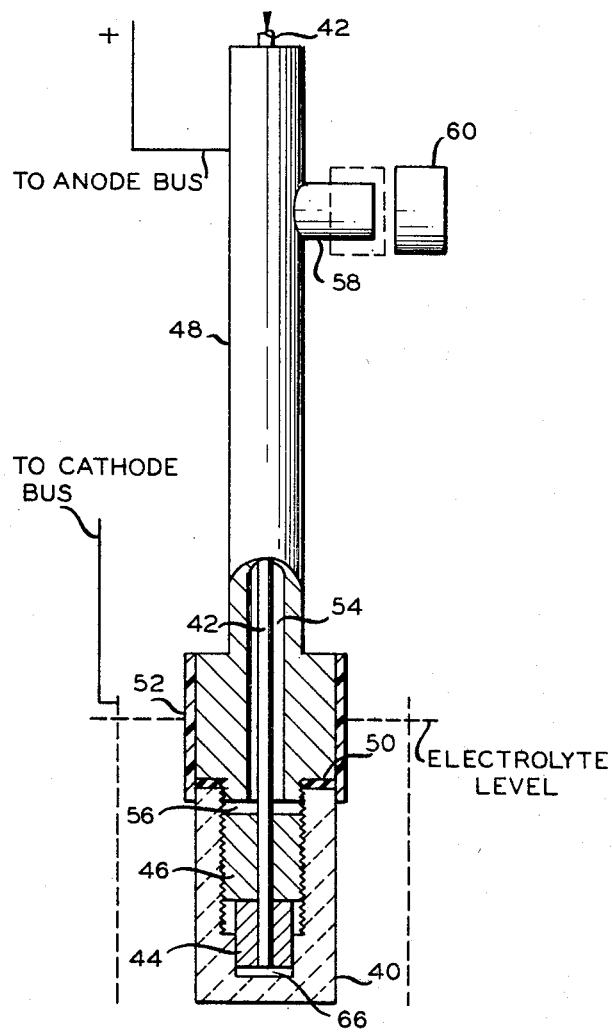
FIG. 2 is a view, partly in cross section, illustrating another electrode assembly in accordance with the invention.

In FIG. 2 a generally tubular conductor and current collector 48 provides support for porous element or member 40 which is similar to porous element or member 10 in FIGS. 1 and 3. One end portion 46 of said tubular conductor 48 is formed with a reduced cross section. A shoulder surrounds the upper end of said reduced cross section portion 46. If desired, a suitable gasket material 50 can be inserted between said shoulder and the upper end of porous element 40. A vent 56 extends through the wall of said portion of reduced cross section 46. Said vent 56 can comprise a plurality of holes drilled through portion 46 into communication with annular space 54. A first conduit 42 extends through said tubular conductor 48, out the lower portion 46 thereof, and forms said annular space 54 within said tubular conductor. A metal plug 44 is mounted on and surrounds the lower end portion of said conduit 42. Said porous element 40 is mounted on said reduced cross section portion 46 against said shoulder and gasket material 50, covers said vent 56, and surrounds said plug 44. An exit vent conduit 58, in communication with said annular space 54, extends outwardly from the upper portion of said conductor and current collector 48. Thus, there is provided a first surface of porous element 40 which comprises the wall surface of chamber 66, which is formed below plug 44, for the introduction of feed reactant into the pores of porous element 40. The upper portion of the inner wall of porous element 40 which is exposed by vent 56 and thus in communication with annular space 54 comprises a second surface for withdrawal of products and unreacted feedstock from within the pores of porous element 40. A further description of said anode assembly and its operation is given hereinafter in connection with Example VI.

Figure 4:
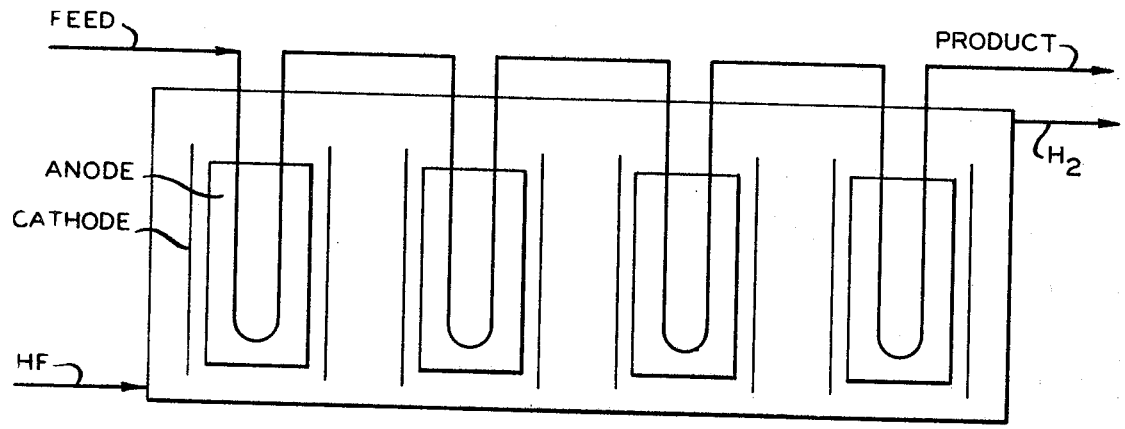
FIG. 4 is a schematic flow diagram illustrating employing electrode assemblies of the invention in a cell series operation.

FIG. 4 illustrates schematically the use of a plurality of anode assemblies, similar to that illustrated in FIG. 3, in series operation. As indicated, the feedstock is introduced into the first anode of the series and unreacted feedstock and products are passed through the remainder of the anodes in the cell, in series, and withdrawn from the cell after passing through the last anode of the series. This operation is described further hereinafter in connection with Example III.

Figure 6:
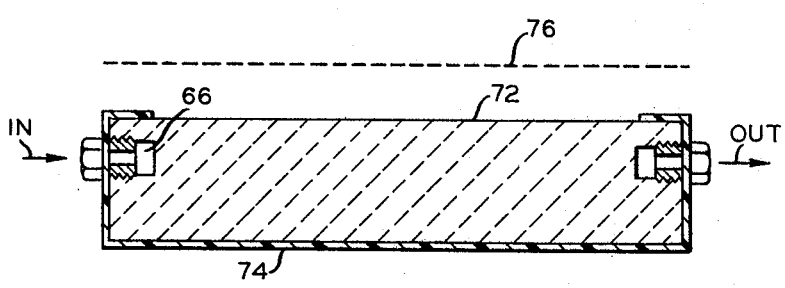
FIG. 6 is a view, in cross section, along the line 6—6 of the anode of FIG. 5.
Figure 5:
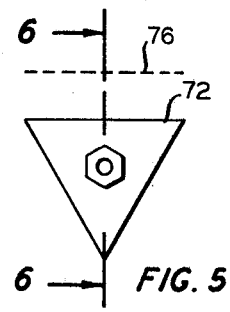
FIG. 5 is a schematic illustration of another cell arrangement and electrode assembly in accordance with the invention.

In the electrode or anode assembly illustrated in FIGS. 5 and 6, the porous element 72 is generally triangular in shape. The first surface through which the feedstock is introduced into the pores of said element 72 comprises the wall of the chamber 66 into which the first conduit (inlet conduit) is connected. The second surface through which the products and any unreacted feedstock are withdrawn from the pores of said element 72 comprises the wall of a similar chamber formed in the other end of the anode and into which the second conduit (outlet conduit) is connected. While said inlet and outlet conduits are shown extending into chambers recessed into said element 72, it is within the scope of the invention to employ connecting means for said conduits similar to that illustrated in FIG. 10. Thus, it is within the scope of the invention to employ all or a portion of the end surfaces of said element 72 for entry of feedstock into the pores and withdrawal of products from the pores. A further description of said anode assembly and its operation is given hereinafter in connection with Example VII.

Figure 7:
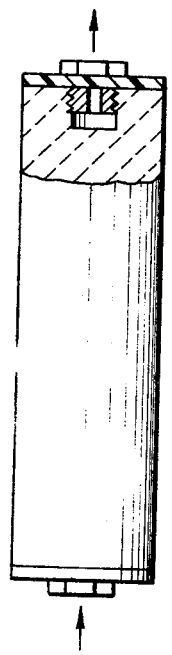
FIG. 7 is a view, partly in cross section, of a generally cylindrical electrode assembly in accordance with the invention.

The electrode assembly illustrated in FIG. 7 is similar to that illustrated in FIG. 6 except that the porous element is generally cylindrical in shape. Obviously, in view of FIGS. 5, 6 and 7, the porous element of FIG. 7 could also be rectangular in shape.

Figure 8:
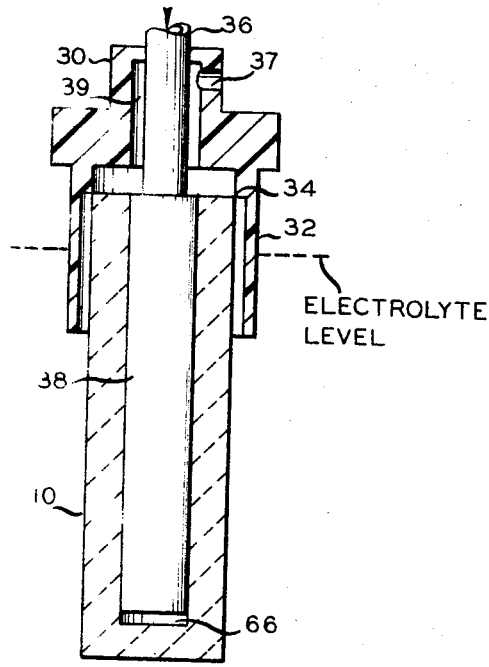
FIG. 8 is a view, partly in cross section, of another electrode assembly in accordance with the invention.

In FIG. 8, the porous element 10 also has the general shape of a hollow tube, closed at one end thereof, and open at the other end. Preferably, the outside bottom surface of said porous element 10 is sealed as in FIGS. 1 and 3. A generally tubular cap 30 formed of a suitable electrolyte resistant material such as Teflon is positioned above the upper end of said porous element 10. A generally tubular flange 32 depends from the lower side of said cap and surrounds the upper end portion of said porous element 10. A shoulder 34 formed on the inner wall of said flange 32 is in contact with the upper end of said porous element. Said cap 30 with its depending flange 32 and shoulder 34 thus forms a gas dome which covers and surrounds the top of said porous element 10 and provides means for supporting same. A first conduit 36 extends through said cap 30 and into the interior of hollow porous element 10. Preferably, said contact between shoulder 34 and the top of porous element 10 is only a "point" contact. However, it is within the scope of the invention for shoulder 34 to overlap a portion of the top of porous element 10. Preferably, the contact between said shoulder 34 and porous element 10 does not form a seal.

With the structure shown, the electrolyte itself serves as a seal.

The lower end portion 38 of said first conduit 36 is in close fitting relationship with the inner wall of porous element 10. If desired, said lower end portion 38 can be threaded into said inner wall. Said lower end portion 38 thus forms a chamber 66 at the lower end thereof which is defined by the lower inner wall of porous element 10 and comprises a first surface for introducing feedstock into the pores of said porous element 10. In passing through cap 30 said first conduit 36 forms an annular space 39 within said cap and above the upper end of porous element 10. An exit vent conduit 37 is in communication with said annular space 39. The upper end surface of porous element 10 comprises a second surface for withdrawal of product and unreacted feedstock from within the pores of said porous element and passing said withdrawn materials through a second conduit means comprising said annular space 39 and exit vent conduit 37.

Figure 9:
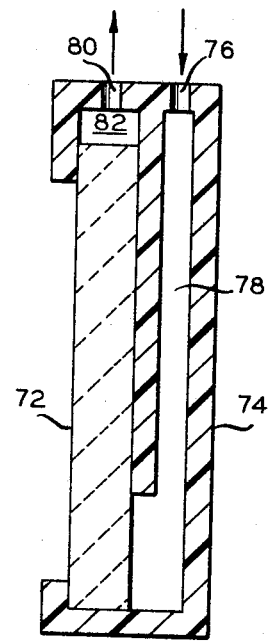
FIG. 9 is a view, partly in cross section, of another electrode assembly in accordance with the invention wherein the porous element can be rectangular in shape.

In FIG. 9, the porous element 72 is generally rectangular in shape and is mounted in a support means comprising a block 74 of an electrolyte resistant material. Said porous element is mounted in a recess along one side of said block support. A first conduit 76 is connected to passageway 78 in said block support 74 and together with said passageway provides a first conduit means in communication with the lower end portion of porous element 72 which comprises a first surface for introduction of feedstock into the pores of porous element 72. A second conduit 80 is connected to said block support 74 and is in communication with space 82 at the upper end of said porous element 72. The upper end surface of element 72 thus comprises a second surface for withdrawal of product and unreacted feedstock. Said porous element 72 can be an essentially square rectangle or an elongated rectangle.

Figure 10:
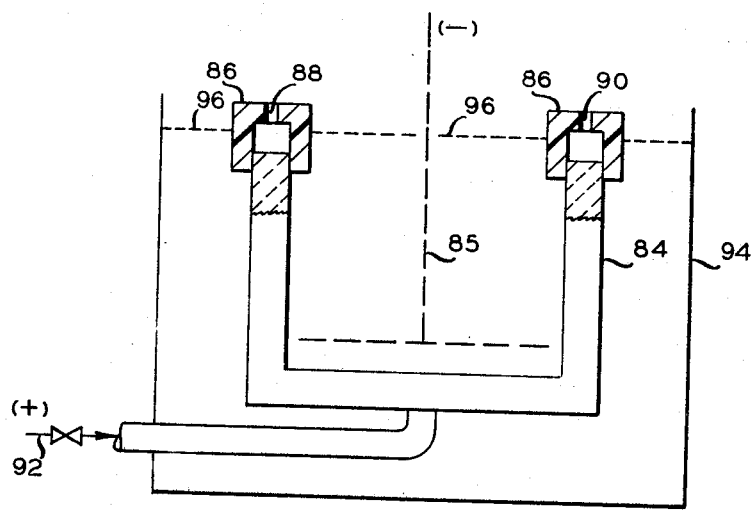
FIG. 10 is a view, partly in cross section, of another cell arrangement and electrode assembly in accordance with the invention.

In FIG. 10, porous element 84 is generally U-shaped. The legs and crossmember of said U can be any suitable shape, e.g., rectangular, cylindrical, or triangular. A cap member 86 covers the end of each of the legs of the U and provides means for connecting conduits to said legs. A first conduit 88 is connected to one of said cap members and is in communication with a first surface comprising the leg and area under the cap 86, said first surface serving for introducing a feedstock into the pores of porous member 84. A second conduit 90 is connected to the other cap 86 on the other leg of said U and is in communication with the end surface of said other leg for withdrawing products and unreacted feedstock from within the pores of porous member 84. Thus, in operation the feedstock enters through conduit 88, flows through the U via the interconnecting pores, and is withdrawn via conduit 90. If desired, the feedstock can be introduced via conduit 92 which is connected at about the midpoint of the crossbar of the U. With this arrangement products and unreacted feedstock are withdrawn through both of conduits 88 and 90. Said porous member 84 is positioned in a suitable cell container 94 containing a suitable electrolyte, the level of which is indicated at 96. It will be noted that said electrolyte level is above the ends of the legs of the U-shaped member and on said caps 86. A suitable cathode 85, here shown to be in the shape of an inverted T, is disposed between the legs of U-shaped member 84.

Figure 11:
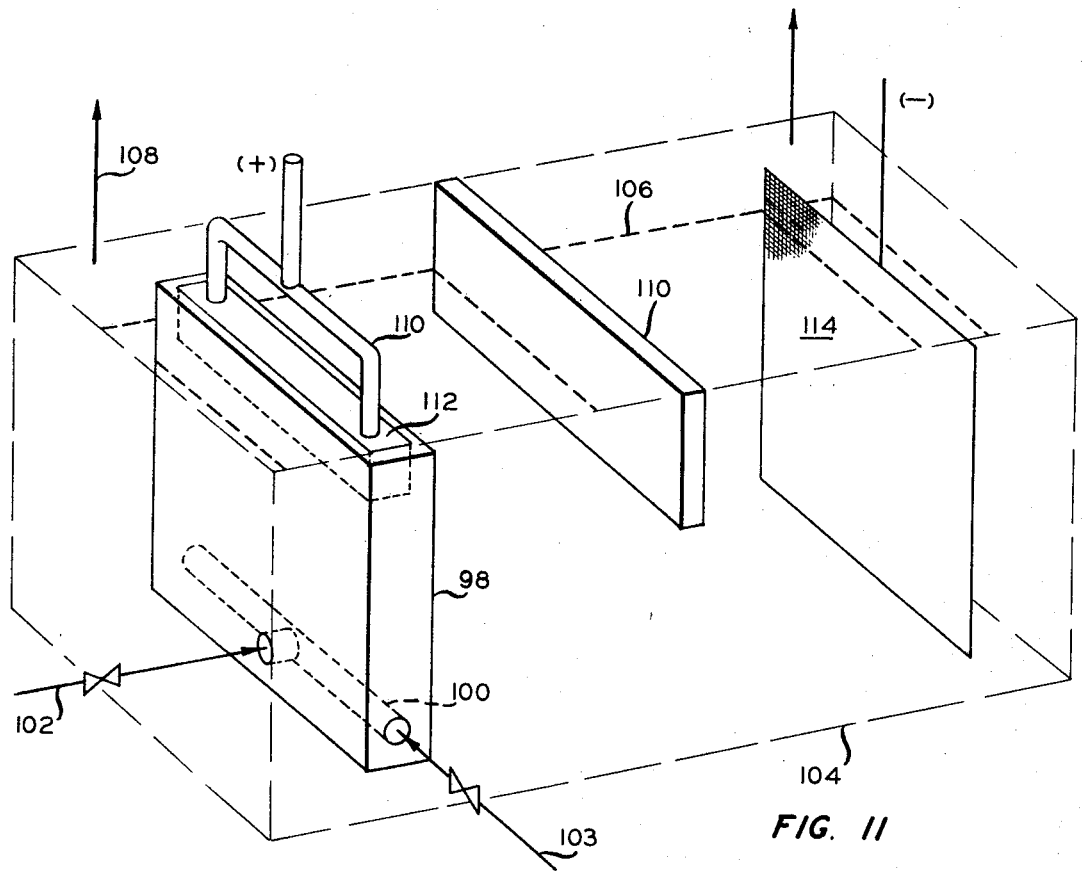
FIG. 11 is a schematic illustration of another cell arrangement and electrode assembly in accordance with the invention.

In FIG. 11, the porous element 98 has the general shape of a rectangular block. A first passageway 100 extends longitudinally into and substantially across said block adjacent the lower end thereof. The interior wall of said passageway 100 comprises a first surface for the introduction of a feed material from first conduit 102 into the pores of said porous element 98. Depending upon the size and configuration of porous element 98, more than one passageway 100 can be provided. Also, if desired the feedstock can be introduced into the center of passageway 100 by means of conduit 103. Said porous element 98 is disposed in a cell container 104 as indicated and the upper end thereof is above the level 106 of the electrolyte in said container. Thus, the upper end surface of porous element 98 comprises a second surface for withdrawing unreacted feedstock and product from the pores of porous element 98. In this cell and electrode arrangement, the space above the electrolyte and conduit 108 comprises the second conduit means for withdrawing product and unreacted feedstock from within the pores of porous element 98. If desired, the space above the electrolyte can be divided by a partition 111 extending from the top of the cell to below the level of the electrolyte to keep the anode products separated from the cathode products. Or, a conventional cell divider can be employed to divide the cell into an anode compartment and a cathode compartment. Current collector 110 comprises a pair of metal bars extending into the top portion of porous element 98. If desired, a metal insert 112 can be provided in the top portion of element 98 to increase current collection efficiency. A cathode 114, fabricated of any suitable metallic material such as a screen, perforated plate, etc., is disposed in said cell as indicated. A further description of said anode assembly and its operation is given hereinafter in connection with Example IV.

Figure 12:
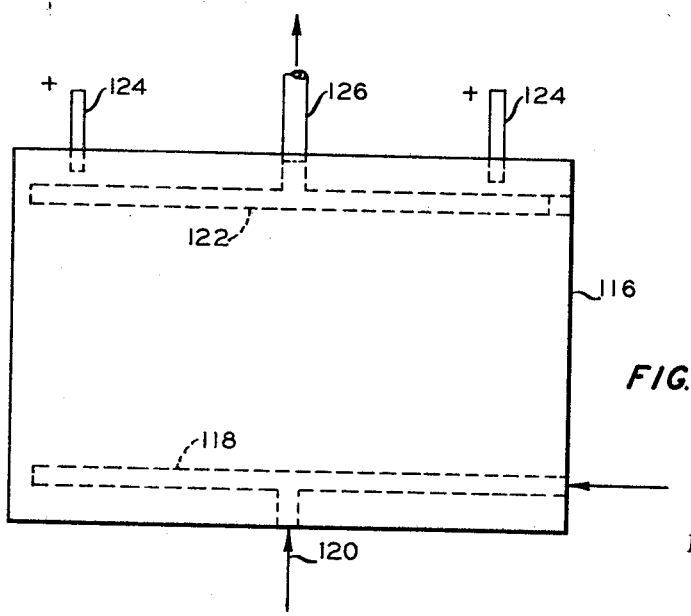
FIG. 12 is a schematic illustration of another electrode assembly in accordance with the invention.

In FIG. 12, porous element 116 has the general shape of a rectangular block. A first passageway 118 extends longitudinally into and substantially across said block adjacent the lower end thereof. The surface of said passageway 118 comprises a first surface for introduction of the reactive feedstock into the pores of porous element 116. First conduit 120 extends into said block and into communication with said first passageway 118 at about the midpoint thereof. If desired, the feed conduit can be connected to one end of passageway 118 as indicated. However, it is preferred to plug the open end of passageway 118 and introduce the feedstock at about the midpoint of said passageway via conduit 120. A second passageway 122 extends longitudinally into and substantially across said block adjacent the upper end thereof. Said second passageway comprises a collection lateral and the surface thereof provides a second surface for withdrawing products and unreacted feedstock from within the pores of said porous element 116. Anode effluent conduit 126 is connected into about the midpoint of passageway 122 as shown. If desired, depending upon the size and configuration of porous element 116, more than one passageway 118 and more than one passageway 122 can be provided. Current collectors 124, comprising metal bars, extend into the upper end of porous element 116. A further description at the structure and details of operation of this anode assembly is given hereinafter in connection with Example V.

The following examples will serve to further illustrate the invention.

EXAMPLE I

A run was carried out for the electrochemical fluorination of methane employing an electrolysis cell containing an anode essentially like that illustrated in FIG. 1. The porous carbon (NC–60) anode comprised a hollow cylinder one inch in diameter, 1½ inches long, and having a ¼-inch wall thickness. Its bottom surface was sealed. The anode was surrounded by a circular cathode consisting of a nickel screen. The anode and cathode were immersed in an electrolyte the composition of which was maintained at $KF \cdot 2HF$ by addition of HF during the run. The conversion was carried out at a temperature of 82° C., a current of 5 amps, a current density of 167 milliamps per square centimeter of anode geometric surface, and a methane feed rate of 40 ml./minute. During this run there was no breakout of the feedstock or products into the electrolyte. The effluent from the anode (free of HF) was analyzed by vapor phase chromatography. The results of this run are shown in the following Table I. (The $O_2$, $N_2$, and CO found in the analysis were impurities in the methane feed.)

TABLE I

| | |
|---|---|
| Current, amp | 5 |
| Voltage | 7.0 |
| Feed rate, ml./min./cm.² anode [1] | 1.33 |
| Feed rate, ml./min./cm.² anode [2] | 67.8 |
| Product comp., area percent: | |
|     NI [3] | 0.58 |
|     Methyl fluoride | 12.28 |
|     1,1-difluoroethane | 0.16 |
|     Ethyl fluoride | 0.20 |
|     Methylene difluoride | 11.55 |
|     Methyl trifluoride | 9.29 |
|     NI [3] | 0.28 |
|     $O_2$ | 0.13 |
|     $N_2$ | 1.83 |
|     Methane | 53.45 |
|     CO | 0.23 |
|     Carbon tetrafluoride | 10.02 |
| Conversion, percent | 46.5 |

[1] Geometric area.
[2] Cross-sectional area.
[3] Not identified.

EXAMPLE II

A run was carried out for the electrochemical fluorination of ethylene dichloride employing an electrolysis cell which contained an anode of the general type shown in FIG. 3. A porous carbon cylinder similar to that of Example I was employed but a close fitting brass plug was inserted into the cylinder (both the plug and cylinder were slightly tapered) to within about ⅛ inch of the bottom of the cylinder. The cylinder was 6 inches long, 2½ inches in outside diameter, and one inch in internal diameter.

The prevaporized ethylene dichloride feed was converted at a feed rate of 1145 grams over a period of 331 minutes. This feed rate corresponded to 2.62 ml./min./cm.² anode geometric area or 29.5 ml./min./cm.² anode cross-sectional area. The current density was 200 ma./cm.², the current level was 60 ams, and the voltage required was about 7.3 volts. The net products amounted to 1226 grams and the ethylene dichloride conversion was 16.2%. The analysis of the products obtained is shown in the following Table II.

TABLE II

| Product: | Mole percent |
|---|---|
| 1,2-dichlorofluoroethane | 31.6 |
| 1,2-dichloro-1,2-difluoroethane | 16.9 |
| 1,2-dichloro-1,1-difluoroethane | 7.5 |
| 1,2-dichlorotrifluoroethane | 17.7 |
| 1,2-dichlorotetrafluoroethane | 17.0 |
| 1,1,2-trichloro-2-fluoroethane | 1.9 |
| 1,1,2-trichloro-1-fluoroethane | 0.2 |
| 1,1,2-trichloro-1,2-difluoroethane | 0.7 |
| 1,1,2-trichloroethane | 2.5 |
| 1,1-dichloro-1,2,2-trifluoroethane | 4.1 |

The data in the table above show that the run was successful in producing moderately fluorinated products of ethylene dichloride.

EXAMPLE III

A series of runs was carried out for the electrochemical fluorination of ethane in a battery of 4 cells employing anodes of the type described in Example II. The "cell" is shown schematically in FIG. 4. The anodes were operated in parallel electrically but were connected in series in regard to the flow of ethane and anode products. Each porous carbon (NC–60) anode had an external geometric surface area of 30 cm.² and was equipped with a close fitting plug in its central hollow section to force the ethane to enter the pores of the porous element at the bottom thereof and to travel upward to the exit port through the network of pores. Thus, in the operation, the ethane feedstock was passed through a first surface of, and into the pores of, the porous element of the first anode. Products and unreacted ethane were withdrawn from within said pores through a spaced apart second surface of said first anode porous element. Said withdrawn stream of products and unreacted ethane was then passed through a first surface of, and into the pores of, the porous element of the second anode. Similarly, products, etc., from the second anode were passed into the third anode, and products, etc., from the third anode were passed into the fourth anode. Effluent from the fourth anode was removed from the cell and analyzed for products of the process.

Run No. 1 was carried out at an ethane flow rate of 100 cc./min., at a temperature of 87–89° C., at a current level of 6 amps, at a current density of 200 ma./cm.², and at 6.5–7.4 volts. Run No. 2 was carried out under identical conditions except the flow rate of ethane was decreased to 60 cc./min. to obtain a greater conversion. The vapor phase chromatography analysis of the products from these runs is shown in the following Table III.

TABLE III

| | Run No. | |
|---|---|---|
| | 1 | 2 |
| Flow rate, ml./min./cm.², anode surface | 3.33 | 2.0 |
| Flow rate, ml./min./cm.², anode cross section | 170.0 | 102.0 |
| Ethane conversion, percent | 61.69 | 79.92 |
| Hydrogen conversion, percent | 27.17 | 42.86 |
| Product analysis, mole percent: | | |
|   Ethyl fluoride | 28.58 | 13.75 |
|   1,2-difluoroethane | 15.79 | 12.54 |
|   1,1-difluoroethane | 12.19 | 9.61 |
|   1,1,2-trifluoroethane | 13.75 | 18.56 |
|   1,1,1-trifluoroethane | 2.30 | 3.19 |
|   1,1,2,2-tetrafluoroethane | 4.49 | 9.26 |
|   1,1,1,2-tetrafluoroethane | 2.64 | 4.75 |
|   Pentafluoroethane | 4.05 | 6.94 |
|   Hexafluoroethane | 10.49 | 14.95 |
|   Difluoromethane | 0 | 0 |
|   Carbon tetrafluoride | 1.26 | 1.08 |
|   Heavies | 4.46 | 5.37 |

The data in the table above show that the anodes of the invention are also capable of converting ethane to desirable fluorine-containing products with high conversion.

EXAMPLE IV

In this run, ethylene dichloride, as well as chlorofluoro products from a recycle stream from a previous run, was electrochemically fluorinated to fluorinated products. Said recycle stream was the effluent from a previous similar run from which effluent most of the 1,2-difluorotetrafluoroethane and lighter materials had been stripped by distillation. The anode employed comprised a piece of rectangular-shaped porous carbon having a height of 14 inches, a width of 10 inches, and a thickness of 1¼ inches. The anode was essentially like that illustrated in FIG. 11. A feed lateral was drilled in the anode across its width ¾ of an inch from the bottom and to within ¾ of an inch of the opposite end. The opening of the drilled hole or passageway was closed with a Teflon plug. The feed entry port was drilled upward from the bottom of the anode to communicate with the midpoint of the feed lateral or passageway. The anode material was a commercial porous carbon (NC–45) which had an effective porosity of about 48 volume percent and an verge pore diameter of about 58 microns.

Twelve (12) inches of the vertical height of the anode was immersed into a molten KF·2HF electrolyte (maintained at about 95° C.) and operated at a current density of 215 ma./cm.² (only the faces of the immersed portion of the anode were used in the area calculation) in conjunction with an iron cathode. The anode products and cathode product (hydrogen) were allowed to mix in this run. The feed was passed into the anode as a liquid and the feed rate was 5.11 moles/hr./ft.², including 0.933 mole of ethylene dichloride, the remainder being recycled products. This feed rate corresponded to 2.05 ml./min./cm.² of anode geometric surface area or 36.5 ml./min./cm.² anode cross-sectional area, calculated as a gaseous rate at standard conditions. The effluent exited the anode smoothly through the portion of the anode extending above the electrolyte level, and the fluorination proceeded without incident indicating satisfactory uniformity in feed distribution. In the abence of such a feed lateral or passageway, such a wide anode suffers localized elemental fluorine production, localized overfluorination of feed, and violent reaction between elemental fluorine and hydrogen.

The effluent from the cell was sampled and analyzed by vapor phase chromatography. The following Table IV shows the analysis of the effluent (on a hydrogen-free basis) as well as the composition of the initial feed.

TABLE IV

| Compound | Feed, mole percent | Effluent, mole percent |
|---|---|---|
| 1,2-dichlorotetrafluoroethane | 2.67 | 14.58 |
| 1,2-dichlorotrifluoroethane | 12.08 | 15.00 |
| 1,2-dichloro-1,1-difluoroethane | 4.62 | 4.40 |
| 1,2-dichloro-1,2-difluoroethane | 10.36 | 10.16 |
| 1,2-dichlorofluoroethane | 20.04 | 17.51 |
| ethylene dichloride | 42.89 | 27.11 |
| chloropentafluoroethane | 0.00 | 1.05 |
| 1-chloro-1,1,2,2-tetrafluoroethane | 0.18 | 0.53 |
| 1-chloro-1,2,2-trifluoroethane | 0.12 | 0.41 |
| 2-chloro-1,1-difluoroethane | 0.67 | 0.81 |
| 1,1,2-trichlorotrifluoroethane | 3.28 | 5.08 |
| 1,1,2-trichloro-1-fluoroethane | 0.56 | 0.41 |
| 1,1,2-trichloro-2-fluoroethane | 1.30 | 1.68 |
| 1,1,2-trichloroethane | 1.23 | 1.27 |

EXAMPLE V

In another run, similar to that of Example IV, the porous carbon anode employed was rectangular-shaped and measured 9 inches high, 12 inches wide, and 1 inch thick. It was essentially like the anode illustrated in FIG. 12. The anode was provided with a feed lateral or passageway located ½ inch from the bottom and an upper lateral or passageway located 5½ inches above said feed passageway (at the electrolyte level). Six (6) inches of the vertical height of the anode was immersed into the KF·2HF electrolyte.

The feed was ethylene dichloride at a rate of 5.91 moles/hr./ft.². The feed was passed into the anode in liquid state. Said feed rate corresponds to 2.25 ml./min./cm.² of anode geometric surface or 27.0 ml./min./cm.² of anode cross-sectional area, calculated as a gaseous rate at standard conditions. The cell was operated at a current density of 215 ma./cm.², and at 95° C. Vapor phase chromatography analysis of a sample of the effluent showed that the conversion was 21% and the effluent had the composition given in Table V, on an ethylene dichloride-free basis.

TABLE V

| Compound: | Mole percent |
|---|---|
| 1,2-dichlorotetrafluoroethane | 22.18 |
| 1,2-dichlorotrifluoroethane | 11.61 |
| 1,1,2-trichlorotrifluoroethane | 4.03 |
| 1,2-dichloro-1,1-difluoroethane | 5.32 |
| 1-chloro-1,1,2,2-tetrafluoroethane | 1.23 |
| 1-chloro-1,2,2,-trifluoroethane | 1.05 |
| 1-chloro-1,2-difluoroethane | 0.81 |
| 2-chloro-1,1-difluoroethane | 1.13 |
| chloropentafluoroethane | 0.97 |
| 1,2-dichloro-1,2-difluoroethane | 9.84 |
| 1,2-dichlorofluoroethane | 38.52 |
| 1,1,2-trichloro-1-fluoroethane | 0.16 |
| 1,1,2-trichloro-2-fluoroethane | 0.97 |
| 1,1,2-trichloroethane | 2.18 |

The cell operated smoothly and the above data indicate that the feed distribution was uniform. An average of about 73 percent of the effluent was collected by means of the upper collection channel or passageway, with as much as 98 percent of some of the lighter products following this path.

EXAMPLE VI

Two series of runs were carried out to demonstrate entry of the feedstock into the pores of a porous anode and the flow of said feedstock within said pores.

In these runs an anode assembly essentially like that illustrated in FIG. 2 was employed. Said anode assembly was employed in a cell container provided with a window for observation of the anode. Said anode assembly comprised a porous carbon cylinder 40 having a side wall thickness of about 0.635 centimeter and an outside vertical surface area of 30 square centimeters. The carbon cylinder had an outside diameter of 1 inch and a height of 1.5 inches. A feed tube 42 extended through a metal plug 44 attached to the end of said feed tube 42. Said metal plug 42 was sized to have a press fit with the lower inner circumference of said carbon cylinder, as illustrated. In assembly of the anode, said feed tube and metal plug are first inserted into the carbon cylinder. Said carbon cylinder is then threaded onto the reduced diameter portion 46 of the anode support and current collector 48, by means of the threads shown. The upper end of the carbon cylinder 40 fits against gasket or seal material 50. Teflon tape seal material 52 coats the lower portion of said metal current collector 48. An annular space 54 is provided around said feed tube 42 within said anode support and current collector 48. Anode inner vent 56 extends from the upper inner surface of anode 40 and into communication with said annular space 54. Said inner vent 56 provides a collection zone for unreacted feedstock and fluorinated products exiting from the pores of the anode. Exit vent 58, in communication with said annular space 54 and said inner vent 56, is provided in the upper portion of said anode support and current collector 48 for withdrawing fluorinated feedstock and any remaining unfluorinated feedstock as anode products. Said anode products can thus be collected separately from the cathode products if so desired. Cap 60 is provided for closing said exit vent as indicated by the dotted lines.

In one series of runs the porous carbon anode 40 was made of National Carbon Company Grade 45 carbon (NC-45) having a pore volume of about 0.5 cc. per gram with pore diameters ranging from 10 to 100 microns. The average pore diameter was about 58 microns. The anode assembly was positioned in a hydrogen fluoride electrolyte, essentially like that described in the other examples, and immersed to the point indicated by the electrolyte level line in FIG. 2. With cap 60 in place, ethylene feed was started flowing into the anode through feed 42 at a rate of 10 liters per hour. The only place bubbles formed was in the top portion of the anode immediately adjacent seal 50, i.e., within the upper 0.25 inch of the anode. This demonstrates that the ethylene had entered the pores of the carbon anode through the wall of chamber 66 and had flowed vertically through the inner connecting pores of the anode without escaping therefrom except at the top as described. The flow rate of ethylene was gradually increased to 60 liters per hour. At 60 liters per hour there was some breakout of feed at points lower than the upper 0.25 inch of the anode but still well within the upper portion of the anode. When the increased flow rate had reached 90 liters per hour, some bubble formation (breakout) was noted toward the bottom portion of the anode. However, it was observed that substantially all of the ethylene continued to flow up through the anode and exit therefrom in the top portion of the anode. When cap 60 was removed there was no breakout from the surface of the anode, even at the 90 liter per hour flow rate.

In another series of runs the porous carbon anode was fabricated from the above-described Stackpole 139 carbon having a pore volume of about 0.2 to 0.3 cc. per gram with the pore diameters ranging from 0.1 to 10 microns. These runs were made with cap 60 removed.

Flow of ethylene was started at 2 liters per hour. No bubble formation outside the upper 0.25 inch portion of the anode was observed until the flow rate had reached 40 liters per hour. This run shows that the less permeable Stackpole 139 carbon will not permit as high a flow rate of gas through its pores as will the more permeable NC-45 carbon.

Another series of runs was made using the Stackpole 139 carbon anode with the cap 60 in place closing exit 58. At flow rates of 2 liters per hour essentially all of the breakout or bubble formation on the outer surface of the anode was within the upper 0.25 inch of the anode. At flow rates of 10 liters per hour there was some breakout (bubble formation) outside the upper 0.25 inch portion of the anode, but substantially all of the breakout was still in the upper 0.25 inch portion of the anode. At flow rates of 40 liters per hour the proportion of breakout outside the upper 0.25 inch portion of the anode increased, but the major portion of the gas was still exiting from the upper portion of the anode. These runs show that even with the less permeable Stackpole 139 carbon, the feed enters the anode near the bottom and flows up through the connecting pores and escapes from the upper portion of the anode.

EXAMPLE VII

In these runs, a horizontal anode 72 as shown schematically in FIGS. 5 and 6 was employed. This anode was 3 inches in length, had a triangular cross section, each side surface was 1½ inches wide, and two surfaces and the ends and part of the third side were insulated with a resistant cement 74. This left 30 cm.$^2$ of uninsulated surface on the anode. This uninsulated surface was turned upward in the electrolyte bath to face an iron wire gauze cathode suspended above it about 1¾ cm. as shown in FIGS. 5 and 6. The electrolyte was the $KF \cdot 2HF$ fused salt. In the run the following operating parameters were held constant: (1) current level: 6 amperes (current density, 200 ma./cm.$^2$); (2) nominal space velocity: 0.58 hr.$^{-1}$ (computed on the basis of no penetration of electrolyte in pores of carbon); (3) cell temperature: 93–95° C.; (4) feed: 1,2-dichloroethane; (5) feed rate: 0.22 g.-moles/hr.; and (6) anode material: NC–60 porous carbon. The only variable in these runs was depth of the anode surface below the surface of the electrolyte. This was achieved by moving the cathode-anode assembly up and down in the electrolyte bath. The feed inlet and products outlet were each connected to conduits (not shown) which extend outside the cell. By this arrangement the feedstock was introduced into the pores of the anode and removed therefrom without contacting the main body of the electrolyte. Results obtained in these runs are summarized in Table VIII below.

TABLE VIII

| Products (mole percent) | Depth of immersion | | | | |
|---|---|---|---|---|---|
| | 9 | 6 | 6 | 6 | 2 |
| $C_2Cl_2F_4$ | 32.7 | 25.2 | 24.9 | 25.6 | 27.7 |
| $C_2Cl_2HF_3$ | 16.4 | 16.6 | 16.8 | 16.8 | 16.6 |
| $C_2Cl_2H_2F_2$ | 17.3 | 20.4 | 20.2 | 19.5 | 19.4 |
| $C_2Cl_2H_3F$ | 23.1 | 25.3 | 25.5 | 24.7 | 24.2 |
| By-products | 10.5 | 12.5 | 12.6 | 13.4 | 12.1 |
| Conversion | 14.5 | 14.9 | 15.4 | 15.3 | 15.1 |

The byproducts were essentially all trichloroethane and monochloroethanes. Cleavage products and dimers and higher condensed products totaled less than 2% of the products in each run. In all runs the number of moles of effluent recovered was the same as the number of moles of 1,2-dichloroethane feedstock (within experimental error). This shows that all the feedstock and all the fluorinated products must have remained within the pores of the anode during the reaction and were withdrawn through the products outlet shown in FIG. 6.

These results demonstrate that a horizontal electrode can be employed under the conditions of the invention with respect to maintaining the fluorination reaction within the porous structure of the carbon anode.

Herein and in the claims, unless otherwise specified, for convenience the volumetric feed rates have been expressed in terms of gaseous volume calculated at standard conditions, even though the feedstock may be introduced into the anode in liquid state.

While certain embodiments of the invention have been described for illustrative purposes, the invention obviously is not limited thereto. Various other modifications will be apparent to those skilled in the art in view of this disclosure. Such modifications are within the spirit and scope of the invention.

I claim:

1. An electrode assembly, suitable for carrying out electrochemical reactions in an electrolysis cell containing an electrolyte, comprising: a porous element; a first conduit means extending into communication with, and together with a wall of said porous element, forming a first chamber comprising a first surface at a first end portion of said porous element for introducing a reactant feedstock into the pores of said porous element; and a second conduit means in communication with a second surface at a second end portion of said porous element for withdrawing reaction product and any unreacted feedstock from said pores; said second surface being separated from and spaced apart from said first surface.

2. An electrode assembly in accordance with claim 1 wherein: said porous element comprises porous carbon and is generally cylindrical in shape; said first surface comprises a wall of said first chamber at said first end of said porous element; said second surface comprises a wall of a second chamber at said second end of said porous element; said first conduit means comprises a first conduit connected to said first end of said porous element; and said second conduit means comprises a second conduit connected to said second end of said porous element.

3. An electrode assembly in accordance with claim 1 wherein: said porous element comprises porous carbon and is generally triangular in shape; said first surface comprises a wall of said first chamber at said first end of said porous element; said second surface comprises a wall of a second chamber at said second end of said porous element; said first conduit means comprises a first conduit connected to said first end of said porous element; and said second conduit means comprises a second conduit connected to said second end of said porous element.

4. An electrode assembly in accordance with claim 1 wherein: said porous element comprises porous carbon and is generally rectangular in shape; said first surface comprises a wall of said first chamber at said first end of said porous element; said second surface comprises a wall of a second chamber at said second end of said porous element; said first conduit means comprises a first conduit connected to said first end of said porous element; and said second conduit means comprises a second conduit connected to said second end of said porous element.

5. An electrode assembly in accordance with claim 1 wherein: said porous element comprises porous carbon and is generally U-shaped; said first surface comprises a wall of said first chamber at the end of one leg of said U; said second surface comprises wall of a second chamber at the end of the other leg of said U; said first conduit means comprises a first conduit connected to said one leg of said U; and said second conduit means comprises a second conduit connected to said other leg of said U.

6. An electrode and cell assembly wherein an electrode assembly in accordance with claim 1 is employed, and wherein: said porous element is porous carbon and has the general shape of a rectangular block; and said first surface comprises a first passageway extending longitudinally into and substantially across said block adjacent the lower end thereof; said second surface comprises the upper end surface of said block; and a metal current collecting means is disposed in the upper portion of said block.

7. An electrode assembly in accordance with claim 1, wherein: said porous element is porous carbon and has the general shape of a rectangular block; said first surface comprises a first passageway extending longitudinally into and substantially across said block adjacent the lower end thereof; and said second surface comprises a second passageway extending longitudinally into and substantially across said block adjacent the upper end thereof.

8. An electrode assembly in accordance with claim 7, wherein: said first conduit means comprises an inlet conduit extending through the bottom of said block into substantially central communication with said first passageway; and said second conduit means comprises an outlet conduit extending through the top of said block into substantially central communication with said second passageway.

9. An electrode assembly in accordance with claim 1, wherein: said porous element comprises porous carbon; support means connected to said porous element are provided for supporting same; said first conduit means comprises a first conduit extending through said support means and into communication with said first chamber and said first surface; and said second conduit means comprises a second conduit in communication with said second surface and extending through said support means.

10. An electrode assembly in accordance with claim 9 wherein: said means for supporting said porous member comprises a generally tubular conductor having one end portion formed with a reduced cross section; a shoulder surrounds the upper end of said portion of said conductor having a reduced cross section; a vent extends through the wall of said reduced end portion of said tubular conductor; said first conduit means comprises a conduit extending through said tubular conductor, out the lower end thereof, and forming an annular space within said tubular conductor; a plug is mounted on and surrounds the lower end portion of said conduit; said porous element is mounted on said reduced cross section portion of said conductor against said shoulder, covers said vent, and surrounds said plug; an exit vent conduit in communication with said annular space extends outwardly from the upper portion of said conductor; said first surface comprises a wall surface of said first chamber which is formed within said porous element below said plug; said second surface comprises that portion of the inner wall surface of said porous element which is exposed to said vent; and said second conduit means comprises said vent, said annular space, and said exit vent conduit.

11. An electrode assembly in accordance with claim 9 wherein: said support means comprises a block of electrolyte resistant material; said porous element comprises a porous carbon plate, has a generally rectangular shape, and is mounted in a recess along one side of said block support; said first conduit means comprises a passageway formed in said block support with the end of said passageway in communication with the lower end portion of said carbon plate as said first surface; and said second conduit means is in communication with the upper end portion of said carbon plate as said second surface.

12. An electrode assembly in accordance with claim 9 wherein said porous element has the general shape of a hollow tube, closed at one end thereof, and open at the other end; said first conduit extends into the lower portion of the interior of said tube to a point adjacent said closed end; a metal plug is mounted on the lower end portion of said first conduit in a close fitting relationship with the inner wall of said hollow tube and divides said inner wall into a lower said first surface and an upper said second surface.

13. An electrode assembly in accordance with claim 1, wherein: said porous element comprises porous carbon and has the general shape of a hollow tube, closed at one end thereof, and open at the other end; a generally tubular cap formed of electrolyte resistant material is positioned above the upper end of said porous element; a generally tubular flange depends from the lower side of said cap and surrounds the upper end portion of said porous element; said first conduit means comprises a first conduit extending through said cap and into said tube with a close fitting relationship with the inner wall of said tube to a point adjacent said closed end, and forming an annular space within said cap and above the upper end of said porous element; an exit vent conduit in communication with said annular space and extending through the outer wall of said cap; said first surface comprises a wall surface of said first chamber which is formed within said porous element below the lower end of said first conduit; said second surface comprises the upper end surface of said porous element; and said second conduit means comprises said annular space and said exit vent conduit.

14. A process for the electrochemical fluorination of a fluorinatable organic compound feedstock, which process comprises:
  (a) passing an electric current through a current-conducting essentially anhydrous liquid hydrogen fluoride electrolyte containing in an electrolysis cell provided with a cathode and a plurality of porous anodes each of which anodes has a porous element provided with spaced apart first and second surfaces in accordance with claim 1;
  (b) passing a stream of said feedstock through a first surface of, and into the pores of, the porous element of the first anode of said plurality of anodes;
  (c) withdrawing a stream of fluorinated products and any remaining unreacted feedstock from within said pores of said first anode through a second spaced apart surface of said first anode;
  (d) passing said withdrawn stream of products and unreacted feedstock through a first surface of a succeeding anode of said plurality of anodes;
  (e) repeating said steps (c) and (d) for said succeeding anode and any further succeeding anodes which succeed said first-mentioned succeeding anode except the last anode in said plurality of anodes, whereby said feedstock, said products, and said any unreacted feedstock are passed through said plurality of anodes in series;
  (f) withdrawing fluorinated products and any remaining unreacted feedstock from the pores of said last anode through a second spaced apart surface thereof and from said cell as a cell effluent stream; and
  (g) recovering desired fluorinated product from said cell effluent stream.

15. A process in accordance with claim 14, wherein: each of said anodes comprises porous carbon; and said stream of feedstock in step (b) and said stream of withdrawn products and unreacted feedstock in steps (d) and (e) are each passed into said succeeding anodes at a flow rate such that the inlet pressure of said feedstock into said pores is less than the sum of (1) the hydrostatic pressure of said electrolyte at the level of entry of said feedstock into said pores and (2) the exit pressure of any unreacted feedstock and fluorinated products from said pores into said electrolyte.

16. A process for the electrochemical conversion of an organic compound feedstock, which process comprises:
  (a) passing an electric current through a current-conducting electrolyte composition contained in an electrolysis cell provided with an anode and a porous cathode which is not wetted by said electrolyte, said cathode being provided with a first surface for introducing feedstock into the pores of said cathode and a spaced apart second surface for withdrawing reaction product and any unreacted feedstock from said pores;
(b) passing a stream of said feedstock through said first surface of, and into the ports of, said cathode;
(c) within said pores, at least partially converting at least a portion of said feedstock;
(d) withdrawing a stream of reaction product and any remaining unreacted feedstock from within said pores of said cathode through said spaced apart second surface and from said cell as a cell effluent stream; and
(e) recovering said reaction product from said cell effluent stream.

17. A process in accordance with claim 16, wherein: said porous cathode comprises porous carbon; and said feedstock in step (b) is passed into the pores of said cathode at a flow rate such that the inlet pressure of said feedstock into said pores is less than the sum of (1) the hydrostatic pressure of said electrolyte at the level of entry of said feedstock into said pores and (2) the exit pressure of any unreacted feedstock and reaction product from said pores into said electrolyte.

References Cited

UNITED STATES PATENTS

| | | | |
|---|---|---|---|
| 2,900,319 | 8/1959 | Ferrand | 204—246 |
| 3,268,364 | 8/1966 | Cade et al. | |

FOREIGN PATENTS 740,723  11/1955  Great Britain.

HOWARD S. WILLIAMS, Primary Examiner

204—294

U.S. Cl. X.R.